United States Patent [19]

Lorimor

[11] 4,053,410
[45] Oct. 11, 1977

[54] FILTER ASSEMBLY WITH MODULATING BYPASS VALVE

[75] Inventor: Larry W. Lorimor, Joliet, Ill.

[73] Assignee: Caterpillar Tractor Co., Peoria, Ill.

[21] Appl. No.: 612,157

[22] Filed: Sept. 10, 1975

[51] Int. Cl.² .......................................... B01D 29/04
[52] U.S. Cl. ................................. 210/132; 210/133; 210/172; 210/223; 210/315; 210/444
[58] Field of Search ............... 210/130, 132, 133, 167, 210/168, 171, 172, 223, 315, 429, 441, 443, 454, 455; 251/121

[56] References Cited

U.S. PATENT DOCUMENTS

| 1,802,897 | 4/1931 | Holden et al. ............... 251/121 X |
| 2,056,756 | 10/1936 | Wiedhofft ..................... 210/133 |
| 2,406,308 | 8/1946 | Vokes et al. .................. 210/130 X |
| 2,575,995 | 11/1951 | Briggs et al. .................. 210/130 X |
| 2,589,920 | 3/1952 | Beckett ........................ 210/130 |
| 2,605,904 | 8/1952 | Ogilvie ......................... 210/132 |
| 3,164,551 | 1/1965 | Nugent ......................... 210/223 |
| 3,235,085 | 2/1966 | Humbert, Jr. .................. 210/130 |
| 3,342,332 | 9/1967 | Kudlatt ........................ 210/315 X |
| 3,543,935 | 12/1970 | Detrick ........................ 210/315 X |
| 3,794,168 | 2/1974 | Perkins ........................ 210/130 X |

FOREIGN PATENT DOCUMENTS

| 697,949 | 1/1931 | France ......................... 210/130 |
| 666,983 | 2/1952 | United Kingdom .............. 210/130 |

*Primary Examiner*—Wilbur L. Bascomb, Jr.
*Assistant Examiner*—Robert Spitzer
*Attorney, Agent, or Firm*—Phillips, Moore, Weissenberger, Lempio & Majestic

[57] ABSTRACT

A filter assembly comprises a housing having a tubular filter and a bypass valve mounted therein. The valve comprises a spool having pressure modulating means thereon in the form of a tubular extension having a plurality of metering orifices formed therethrough. In normal operation, fluid is communicated from an inlet of the housing, through the filter and to an outlet. When the inlet pressure of the fluid exceeds a predetermined level due to clogging of the filter, for example, the fluid is communicated from the inlet to the outlet directly, through the metering orifices of the valve. The spool has a cylindrical portion which forms a sliding seal with a cylindrical bore defined in the housing to prevent premature opening of the bypass valve.

15 Claims, 3 Drawing Figures

FILTER ASSEMBLY WITH MODULATING BYPASS VALVE

BACKGROUND OF THE INVENTION

A conventional filter assembly for filtering-out contaminants from a lubricating or working fluid normally comprises a stationary housing having an annular cartridge-type filter removably mounted therein. A bypass valve of the poppet-type is normally mounted in the filter assembly to open and communicate fluid from the inlet to the outlet thereof directly, when the filter becomes clogged, for example. Filter assemblies of this type are exemplified by U.S. Pat. Nos. 2,886,180; 3,556,300; and 3,628,661 and U.S. application Ser. No. 562,383 filed on Mar. 26, 1975 by A.L. Kufuss for "Removable Filter Assembly With Bypass Valve", all assigned to the assignee of this application.

One disadvantage of such filter assemblies is their inability to modulate fluid pressure in the system upon opening of the bypass valve. In addition, the poppet valves thereof are highly sensitive to pressure pulsations and thus function as a "shock absorber" to open even during normal filtering operations. An opening of only one-sixteenth of an inch, for example, will bypass unfiltered oil through the system.

SUMMARY OF THIS INVENTION

An object of this invention is to provide an improved filter assembly which is adapted to closely modulate fluid pressures during a bypass condition of operation thereof. The filter assembly comprises a housing having an inlet and an outlet and a filter mounted in the housing along with a bypass valve. The bypass valve comprises a spool reciprocally mounted in the housing and having pressure modulating means secured thereto for simultaneous movement therewith. Upon opening of the bypass valve, the pressure modulating means functions to meter and modulate fluid flow therethrough.

Another feature of this invention comprises the formation of a cylindrical portion on the spool which forms a sliding seal with a cylindrical bore defined in the housing. The seal will function to normally close the bypass valve and to compensate for pressure pulsations in the system whereby premature opening of the valve is prevented.

BRIEF DESCRIPTION OF THE DRAWING

Other objects of this invention will become apparent from the following description and accompanying drawing wherein.

DETAILED DESCRIPTION

Figure 1:
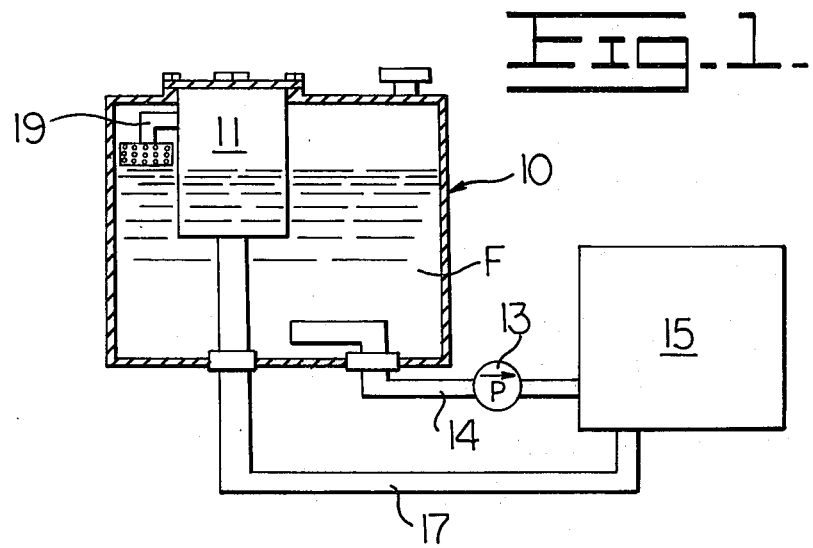
FIG. 1 schematically illustrates the filter assembly of this invention integrated into a fluid circuit.

FIG. 1 illustrates a tank 10 for retaining a lubricating or working fluid F, such as oil, in a storage chamber thereof. A stationary housing 11 is secured within the tank and has a filter assembly 12 (FIG. 2) removably mounted therein. In normal operation, a pump 13 draws fluid from the tank and pumps it through a first conduit 14 for use in a work system 15, such as a lubricating circuit for an engine, a working circuit for hydraulic cylinders, or the like. The fluid is returned to an inlet 16 of the filter assembly, formed on an underside of housing 11 FIG. 2), via a second conduit 17. The fluid then passes upwardly through the filter assembly and through an outlet 18 of the housing whereby it is returned to tank 10 via and outlet conduit 19.

Figure 2:
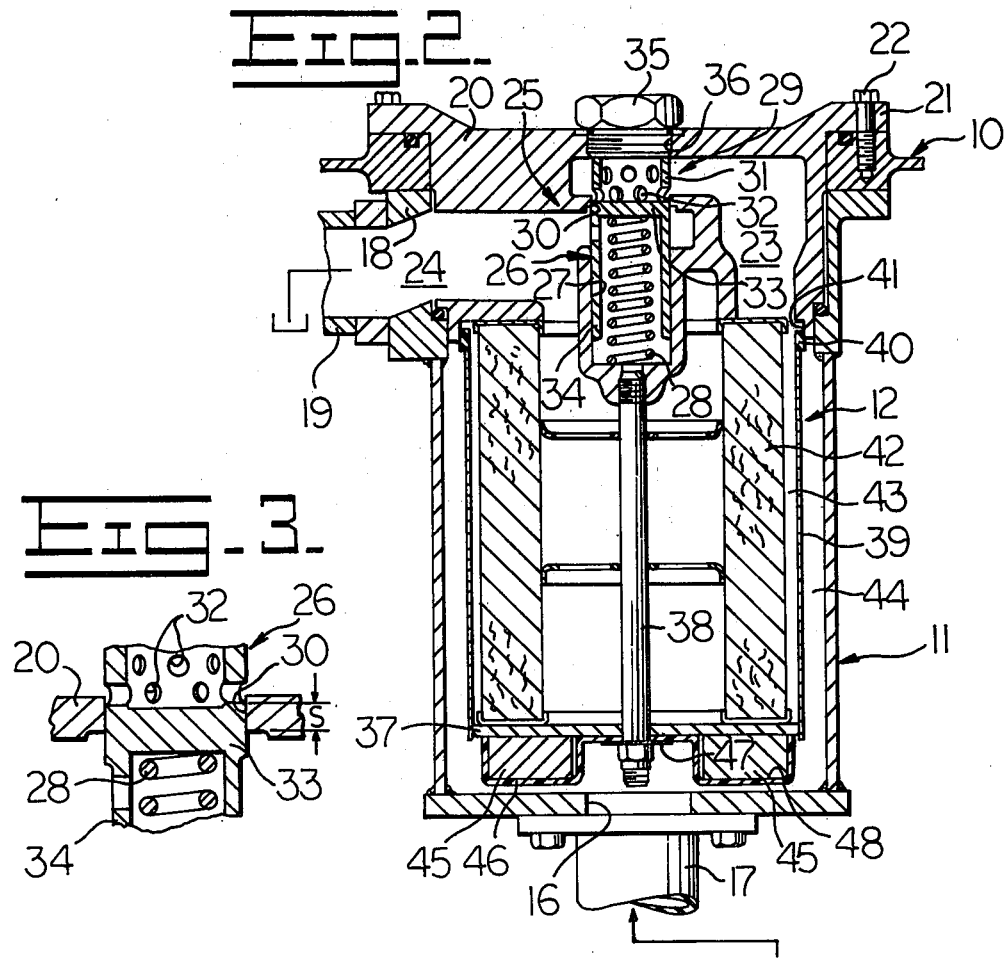
FIg. 2 is an enlarged longitudinal sectional view of the filter assembly.

Referring to FIG. 2, the filter assembly comprises an annular cover member 20 having a radial flange 21 detachably mounted on tank 10 to form part of housing 11, by a plurality of circumferentially disposed cap screws 22. The cover defines a pair of chambers 23 and 24 therein which are normally blocked by a bypass valve means 25. The valve means comprises a cylindrical spool 26 reciprocally mounted in a bore 27 formed in the cover and a compression coil spring or spring means 28, disposed between the spool and the cover to normally bias the spool upwardly to its closed position.

The spool comprises pressure modulating means 29 secured on an upper end thereof for metering fluid flow past an annular control port or cylindrical bore 30 formed in the cover of the housing. The modulating means comprises a tubular extension 31 of the spool having a plurality of metering orifices 32 formed therethrough. The spool further comprises an annular closed wall 33 secured therein between the ends thereof with the extension being secured to an upper side of the wall and a cylindrical portion 34 of the spool being secured to an underside of the wall.

Figure 3:
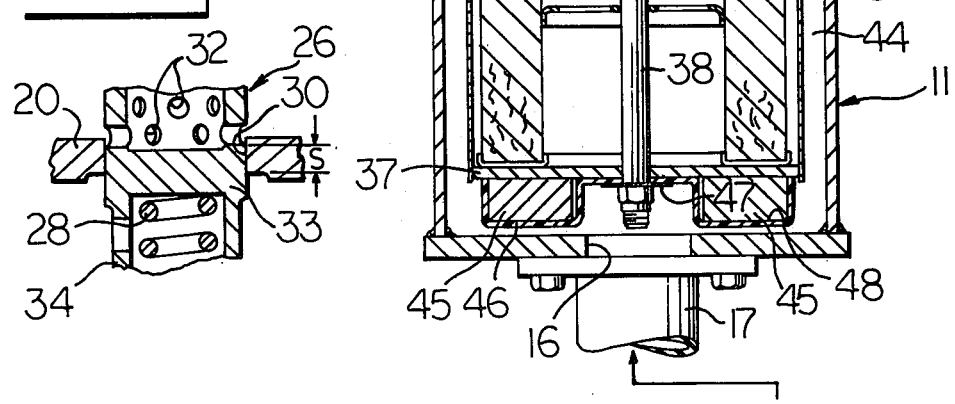
FIG. 3 is an enlarged fragmentary view of a sliding seal employed in a bypass valve of the filter assembly.

Referring to FIG. 3, it should be noted that outer cylindrical portions of spool 26, defined by an axial dimension S, are closely fitted within cylindrical bore 30 to define a sliding seal thereat normally closing the bypass valve. As mentioned above, a conventional poppet valve is sensitive to pressure pulsations in a lubricating system and will tend to open even during normal operations when all of the oil is intended to pass through the filter. Although the sliding seal defined at S will also be subject to a "shock absorbing" function resulting from pressure fluctuations during normal filtering operations, a sufficiently long sealing area is provided thereat to prevent premature opening of the bypass valve.

The upper end of extension 31 further functions as a stop means on the spool normally engaging a large pan bolt 35, forming part of the cover, to hold the spool in its closed position and to precisely define axial dimension S of the sliding seal (FIG. 3). Bolt 35 is axially aligned with the spool and is threadably mounted in a threaded aperture 36 formed through the cover to provide means removably mounted thereon to solely expose the bypass valve means. Threaded aperture 36 has an inside diameter slightly larger than the outside diameter of spool 26 to facilitate removal of the spool through the cover member.

The filter assembly further comprises an annular support member 37 releasably attached to the cover member in axially spaced relationship therewith by an elongated bolt 38. A cylindrical screen 39 has its lower end welded to the support member and a cylindrical sealing gasket 40 is secured to the upper end of the screen and is slidably mounted within an annular recess 41 formed in the cover. A tubular cartridge-type filter 42 is disposed within the screen and is secured in place between the cover and the support member by bolt 38.

The outer periphery of the filter is positioned radially inwardly from screen 39 to define an annular passage 43 therebetween. Likewise, the screen is disposed radially inwardly from housing 11 to define an annular chamber 44 therebetween communicating directly with inlet 16.

Magnet means, preferably in the form of a plurality of bar magnets 45, are disposed on an underside of the support member in axial opposition to the inlet and are held in place thereon by a retainer 46. The retainer is held in place by bolt 38 and a washer 47 and is suitably stamped to define a plurality of radially outwardly extending and circumferentially disposed pockets 48, each retaining a bar magnet therein.

In operation, fluid normally flows from inlet 16 and through annular chamber 44, screen 39, passage 43, filter 42 and chamber 24. The latter chamber communicates with outlet 18 to return the fluid to tank 10 (FIG. 1) with the sliding seal defined at S (FIG. 3) functioning the compensate for pressure pulsations occurring in the system to prevent premature opening of the bypass valve. Bar magnets 45 will function to substantially uniformly disperse the fluid radially outwardly to annular chamber 44, whereby uniform filtering is achieved. In addition, the magnets will function to pick-up metallic particles contained in the fluid flowing thereover.

When the fluid pressure in chamber 44, passage 43 and chamber 23 exceeds a predetermined level, such as when filter 42 becomes clogged, bypass valve means 25 will open. Orifices 32 of the pressure modulating means will function to precisely meter fluid flow past control port 30 and into chamber 24 and outlet 18. The pressure modulating means will thus prevent undue pressure surges and fluctuations in the system due to its precisely calibrated control of the differential pressure prevalent on the downstream and upstream sides of the bypass valve means.

I claim:

1. In a filter assembly of the type comprising a housing having an inlet and an outlet, a filter mounted in said housing and bypass valve means movable between a closed position for sequentially permitting communication of fluid from said inlet, through said filter and to said outlet and an open position for sequentially communicating fluid from said inlet, through a port of said bypass valve means and to said outlet, the improvement wherein said bypass valve means comprises a reciprocally mounted spool and pressure modulating means secured to said spool, comprising a tubular extension formed on an upper end of said spool having a plurality of metering orifices formed therethrough and continuously exposed to fluid from said inlets, for simultaneous movement therewith for modulating the pressure of said fluid through said bypass valve means upon opening thereof by metering fluid directly through said orifices, through said port and to said outlet to contol variable differential fluid pressures prevalent on downstream and upstream sides thereof.

2. The filter assembly of claim 1 wherein said plurality of metering orifices are disposed in circumferentially and axially spaced relationship relative to each other on the tubular extension of said spool.

3. The filter assembly of claim 2 wherein said spool is cylindrical and is reciprocally mounted in said port and further comprises an annular closed wall secured therein between ends thereof, said extension secured on an upper side of said wall and a cylindrical portion of said spool secured to an underside of said wall.

4. The filter assembly of claim 2 further comprising a cover detachably mounted on said housing, a support member attached to said cover in axially spaced relationship therefrom, a tubular screen disposed axially between said cover and said support member and further disposed radially inwardly from said housing to define an annular chamber therebetween communicating directly with said inlet, said filter being tubular and disposed within said screen and positioned radially inwardly therefrom to define an annular passage therebetween.

5. The filter assembly of claim 4 wherein said bypass valve means is solely removably mounted in said cover and a single bolt means is removably mounted on said cover for exposing the spool of said bypass valve means for permitting removal thereof through said cover.

6. The filter assembly of claim 5 wherein said spool is reciprocally mounted in a bore formed in said cover and is disposed in axial alignment with said bolt means and has an outside diameter which is at least slightly less than the inside diameter of a threaded aperture formed through said cover to threadably receive said bolt means therein.

7. The filter assembly of claim 6 wherein an upper end of the extension of said spool normally engages said bolt means to hold said spool in a closed position and wherein said bypass valve means further comprises spring means disposed between said housing and said spool for biasing said spool towards said bolt means.

8. The filter assembly of claim 4 wherein said cover and said support member are attached together by an elongated bolt threadably mounted to said cover.

9. The filter assembly of claim 4 further comprising magnet means attached on an underside of said support member and disposed closely adjacent to said inlet.

10. The filter assembly of claim 9 wherein said magnet means comprises a plurality of bar magnets disposed to extend radially outwardly on said support member and spaced circumferentially therearound and further comprising an annular retainer attached to a bottom side of said support member and defining a plurality of radially disposed pockets therein, one of said bar magnets retained in each of said pockets.

11. In a filter assembly of the type comprising a housing having an inlet and an outlet, a filter mounted in said housing and bypass valve means movable between a closed position for sequentially permitting communication of fluid from said inlet, through said filter and to said outlet and an open position for sequentially communicating fluid from said inlet, through a port of said bypass valve means and to said outlet, the improvement wherein said bypass valve means comprises a cylindrical spool having a cylindrical portion thereof closely fitted for reciprocation in a cylindrical bore defined in said housing to define said port and to further define a sliding seal thereat normally closing said bypass valve means for preventing premature opening thereof when said bypass valve means is subjected to pressure pulsations and a tubular extension formed on an upper end of said spool having a plurality of metering orifices formed therethrough to comprise said bypass valve means for communicating bypassed fluid directly through said orifices, through said port and to said outlet and to receive fluid from said inlet directly, said orifices continuously exposed to fluid from said inlet during both the closed and open positions of said bypass valve means.

12. The filter assembly of claim 11 wherein said spool further comprises an annlar closed wall secured therein between ends thereof, said extension secured on an upper side of said wall and a cylindrical portion of said spool secured to an underside of said wall.

13. The filter assembly of claim 11 further comprising a cover detachably mounted on said housing and wherein said bypass valve means is solely removably mounted in said cover and a bolt means is removably mounted on said cover for exposing the spool of said bypass valve means for permitting removal thereof through said cover.

14. The filter assembly of claim 13 wherein said spool is reciprocally mounted in a bore formed in said cover and is disposed in axial alignment with said bolt means and has an outside diameter which is at least slightly less than the inside diameter of a threaded aperture formed through said cover to threadably receive said bolt means therein.

15. The filter assembly of claim 14 wherein an upper end of the extension of said spool normally engages said bolt means to hold said spool in a closed position to define an axial dimension of said sliding seal and wherein said bypass valve means further comprises spring means disposed between said housing and said spool for biasing said spool towards said bolt means.

* * * * *